Patented Feb. 9, 1954

2,668,805

UNITED STATES PATENT OFFICE 2,668,805

COMPOSITIONS COMPRISING POLYEPOXIDES AND POLYHYDRIC PHENOL POLYETHER ALCOHOLS HAVING TERMINAL PHENOLIC GROUPS

Sylvan Owen Greenlee, Racine, Wis., assignor to Devoe & Raynolds Company, Inc., Louisville, Ky., a corporation of New York No Drawing. Application April 10, 1952,
Serial No. 281,681

14 Claims. (Cl. 260—42)

This invention relates to new polyepoxy products and compositions resulting from the reaction of complex polyhydric phenol polyether alcohols and polyepoxides in regulated proportions which are valuable compositions for use in the manufacture of varnishes, molding compositions, adhesives, films, fibres, molded articles, etc. The invention includes the new polyepoxide products and compositions, compositions used in making the same, and articles and products made therefrom.

The complex polyhydric phenol polyether alcohols used in the new compositions and in making the new compositions and products are polyether alcohols of polyhydric phenols, and particularly of dihydric phenols, having terminal phenolic hydroxyl groups and one or more intermediate aliphatic alcoholic hydroxyl groups contained in one or more intermediate aliphatic nuclei of the polyphenol ethers.

One of the objects of the invention is the production of new polyepoxy polyhydroxy products by the reaction of such complex polyhydric phenol polyether alcohols with more than one equivalent proportion of polyepoxides, so that each phenolic hydroxyl of the complex polyhydric phenol polyether alcohols reacts with an epoxide group of a polyepoxide to form polyepoxy polyhydroxy compounds free from phenolic hydroxyl groups.

Another object of the invention is the production of complex polymeric polyepoxides by the reaction of such complex polyhydric phenol polyether alcohols with polyepoxides in proportions such that complex polymeric products are formed containing a plurality of polyhydric phenol polyether alcohol residues united through polyhydroxy-containing nuclei from polyepoxides and with terminal aliphatic epoxy-containing groups.

Another object of the invention is the production of compositions containing such complex polyhydric phenol polyether alcohols and polyepoxides in proportions suitable for reaction by direct addition and without the formation of byproducts to form resins, films, molding compositions, etc.

Another object of the invention is the production of intermediate reaction products of the complex polyhydric phenol polyether alcohols and polyepoxides which are capable of further reaction to form insoluble infusible products, and the production of higher molecular weight and more complex epoxy compositions from such lower molecular weight epoxy compositions.

Another object of the invention is the production of compositions containing such complex polyhydric phenol polyether alcohols with polyepoxides which are themselves polymeric products.

Another object of the invention is the production of compositions containing polyepoxides together with complex polyhydric phenol polyether alcohols which are themselves complex polymeric polyether reaction products of polyhydric phenols with terminal phenolic hydroxyl groups.

Another object of the invention is the production of films, articles, molded products and other final reaction products from such compositions of polyepoxides and complex polyhydric phenol polyether alcohols.

Other objects of the invention will appear from the following more detailed description.

The complex polyhydric phenol polyether alcohols used in making the new products and compositions are themselves made from polyhydric phenols, and particularly from dihydric phenols, which are converted into polyhydric phenol ethers or polymeric ethers with one or more intermediate aliphatic alcoholic hydroxyl-containing groups or nuclei. The aliphatic groups or nuclei may contain one or more alcoholic hydroxyls in each group or nucleus. The complex polyhydric phenol polyether alcohols may thus be made from 2 mols of dihydric phenol and 1 mol of epichlorhydrin, or from 3 mols of dihydric phenol and 2 mols of epichlorhydrin, in which case the intermediate aliphatic groups will be —CH$_2$CHOHCH$_2$— groups. The complex polyhydric phenol polyether alcohols may also be produced by the reaction of 2 mols of dihydric phenol with 1 mol of an aliphatic diepoxide, or 3 mols of a dihydric phenol with 2 mols of a diepoxide, in which case the intermediate aliphatic groups or nuclei will contain at least 2 aliphatic hydroxyls in each nucleus. More complex and higher polymeric polyhydric phenol polyether alcohols can be produced from the reaction of e. g. a dihydric phenol with less than the equivalent amount of epichlorhydrin or of diepoxide to give polymeric reaction products containing terminal phenolic hydroxyl groups.

The polyhydric phenols which are used to make the complex polyhydric phenol polyether alcohols include two or more phenolic hydroxyl groups, which may be in one nucleus as in resorcinol or in different nuclei of fused ring systems as in 1,5-dihydroxy naphthalene or in different nuclei of ring systems attached by chains composed of one or more atoms, in which case the chains should be free from elements which interfere with the reaction of the polyepoxides with the phenolic hydroxyl groups. The phenolic nuclei or the chains linking phenolic nuclei may contain substituents providing they do not interfere with the desired reaction of the polyepoxide with the phenolic hydroxyl groups. Illustrative of polyhydric phenols which may be used in making the complex polyhydric phenol polyether alcohols are mono-nuclear phenols such as resorcinol, hydroquinone, catechol, phloroglucinol, etc. and polynuclear phenols such as bis phenol (p,p'-dihydroxy diphenyl dimethyl methane), p,p'-dihydroxy benzophenone, p,p'-dihydroxy diphenyl, p,p'-dihydroxy dibenzyl, bis-(4-hydroxy phenyl) sulfone, 2,2'-dihydroxy 1,1'-dinaphthyl methane, polyhydroxy naphthalenes and anthracenes, o'-p'-tetrahydroxy diphenyl dimethyl methane and other dihydroxy or polyhydroxy diphenyl or dinaphthyl dialkyl methanes, etc.

The polyhydric phenols used in making the complex polyhydric phenol polyether alcohols may also be complex reaction products of simpler polyhydric phenols, such as bis phenol, with dichlorides such as dichlordiethyl ether, dichlorbutene, etc. in the presence of caustic soda and in proportions so that the resulting reaction products will contain terminal phenolic hydroxyl groups. Thus a complex polyhydric phenol may be produced from bis phenol with dichlordiethyl ether and caustic alkali which may be assumed to have the following formula:

$$HOR[OCH_2CH_2OCH_2CH_2OR]_nOH$$

in which R is the residue from bis phenol and $n$ indicates the degree of polymerization which may be, e. g., 1, 2, etc. Complex polyhydric phenols from, e. g., bis phenol and dichlorbutene with the use of caustic alkali may be assumed to have the following general formula:

$$HOR[OCH_2CH=CHCH_2OR]_nOH$$

in which R and $n$ have the meaning indicated above. The complex polyhydric phenols thus produced from dichlorides and simpler polyhydric phenols are more complex or polymeric products in which, e. g., two simpler dihydric phenol residues are united through a residue from the dichloride. With less than two molecular proportions of the simpler dihydric phenol to one of the dichloride, and with the simpler dihydric phenol used in excess of the dichloride, a polymeric product is produced in which, e. g., 3 mols of dihydric phenol are reacted with 2 mols of dichloride; or to give products of a higher degree of polymerization.

In special cases, the polyhydric phenols used in making the complex polyhydric phenol polyether alcohols may themselves be complex polyhydric phenols which are produced by the reaction of dibasic acids with polyhydric phenols such as bis phenol to give products which, in the case of the use of adipic acid with bis phenol, may be considered to have the following formula:

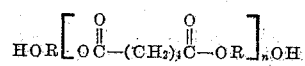

in which R is the residue from the bis phenol and $n$ the degree of polymerization. Similar products can be made from other dibasic acids.

In converting such polyhydric phenols into the complex polyhydric phenol polyether alcohols, they are reacted with less than the equivalent amount of epichlorhydrin and alkali sufficient to combine with the chlorine of the epichlorhydrin or other chlorhydrin used, or the dihydric phenols are reacted with less than the equivalent amount of an aliphatic diepoxide; so that the resulting reaction products will contain terminal phenolic hydroxyl groups and will be converted into polyether derivatives with intermediate aliphatic alcoholic hydroxyl-containing nuclei.

The complex dihydric phenol polyether alcohols may be of a monomeric form such as one having the following formula:

$$HO-R-O-R'-O-R-OH$$

in which R is the residue or nucleus of the dihydric phenol and R' is the aliphatic hydroxyl-containing nucleus, as where 2 mols of a dihydric phenol are reacted with 1 mol of epichlorhydrin in the presence of sufficient alkali to combine with the chlorine of the chlorhydrin, or where 2 mols of a dihydric phenol are reacted with 1 mol of an aliphatic diepoxide such as diglycid ether or 1,2-epoxy-3,4-epoxy butane. Similarly, where 3 mols of dihydric phenol are reacted with 2 mols of epichlorhydrin or of aliphatic diepoxide, or where 4 mols of dihydric phenol are reacted with 3 mols of epichlorhydrin or aliphatic diepoxide, etc., the products will be polymeric products having the following formula or structure:

$$HO-R-[O-R'-O-R]_x-O-R'-O-R-OH$$

where $x$ indicates the degree of polymerization in the complex polyhydric phenol polyether alcohol, e. g. 1, or 2, or 3, or more.

In making the complex polyhydric phenol polyether alcohols from a dihydric phenol and an aliphatic polyepoxide, the dihydric phenol is used in excess to form a reaction product containing terminal phenolic hydroxyl groups, and it is itself a polyether derivative resulting from the reaction of the dihydric phenol and polyepoxide. Thus, for example, a reaction product can be made, e. g., from 2 mols of bis phenol and 1 mol of a diepoxide such as butylene diepoxide or bis-(2,3-epoxypropyl) ether, or from 3 mols of bis phenol and 2 of such diepoxides, or 4 mols of bis phenol and 3 mols of such diepoxides, etc. The resulting reaction products will be polyether alcohol derivatives of polyhydric phenols with terminal phenolic hydroxyl groups.

Similarly, where the complex polyhydric phenol polyether alcohols are made from a dihydric phenol such as bis phenol and epichlorhydrin (with caustic alkali), the dihydric phenol is used in excess, with less than the equivalent amount of epichlorhydrin, so that the resulting polyhydric phenol ether will have terminal phenolic hydroxyl groups as well as one or more intermediate aliphatic alcoholic hydroxyl-containing groups.

The polyepoxides used for reaction with the complex polyhydric phenol polyether alcohols will in general contain two or more epoxide groups. The simplest diepoxides will contain at least four carbon atoms, as in the case of 1,2-epoxy-3,4-epoxy butane. The epoxy groups may be separated from each other by ether groups or linkages as in the case of bis-(2,3-epoxy propyl) ether, bis-(2,3-epoxy 2-methyl propyl) ether, etc. The expoxide groups may also be separated from each other by both ether groups or linkages and intermediate groups as in the case of the diglycid ethers of dihydric phenols. The polyepoxides may also be of a somewhat more complex character such as those which result from the reaction of 2 or more mols of a diepoxide with 1 mol of a dihydric phenol, or the reaction of 3 or more mols of a diepoxide with 1 mol of a trihydric phenol, etc. The polyepoxides may also be somewhat more complex in character, such as result from the reaction of 2 mols of dihydric phenol with 3 mols of epichlorhydrin in the presence of caustic alkali, or 3 or more mols of epichlorhydrin with less than the equivalent amount of dihydric phenol. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the reaction between the epoxide groups and the phenolic hydroxyl groups. The polyepoxides are free from reactive groups other than epoxide and aliphatic hydroxyl groups.

The simpler diepoxides can be produced and obtained of a high degree of purity by fractional distillation to separate them from byproducts formed during their manufacture. Thus bis-(2,3-epoxy propyl) ether or diglycid ether can be produced and separated by fractional distillation to give products of high purity, e. g., around 97% or higher as determined by the method of epoxide analysis hereinafter referred to. When polyepoxides are produced of higher molecular weight and which are difficult to isolate by fractional distillation they can nevertheless be advantageously used, after purification to remove objectionable inorganic impurities and catalysts such as caustic alkali and without separation of the diepoxides or polyepoxides from admixed byproducts such as monoepoxide products, etc. Valuable polyepoxides for use in making the new compositions can be obtained by the reaction of epichlorhydrin on polyhydric alcohols containing 3 or more hydroxyl groups. Thus a trihydric alcohol such as glycerol or trimethylol propane can be reacted with epichlorhydrin in the proportions of 1 mol of trihydric alcohol to 3 mols of epichlorhydrin, using a catalyst which will promote the reaction of the epoxide group of the epichlorhydrin with a hydroxyl group of the alcohol, and with subsequent treatment of the reaction product to remove chlorine from the reaction product and to produce a polyepoxide. Such polyepoxides may contain, e. g., approximately 2 epoxy groups per molecule, even though 3 mols of epichlorhydrin are reacted with 1 mol of a trihydric alcohol. More complex or side reactions apparently take place which result in the production of products containing free hydroxyl groups or cyclic ring compounds or polymeric compounds which may be present in the resulting product. But such polyepoxide products can nevertheless advantageously be used as polyepoxides for reaction with polyhydric phenols in forming the new compositions.

The polyepoxides used may contain small and varying amounts of admixed monoepoxides. To the extent that monoepoxides are present they will react with the polyhydric phenols to form terminal groups or residues containing hydroxyl groups and to the extent that such terminal hydroxyl groups are present the complex polyepoxide compositions will contain complex epoxy-hydroxyl compounds containing both terminal epoxide-containing residues and terminal hydroxyl-containing residues. The presence of monoepoxides or of monoepoxy-hydroxyl compounds does not interfere with the production of the new products provided a sufficient amount of polyepoxides is present to serve as polyfunctional reactants with the complex polyhydric phenol polyether alcohols. The presence of monoepoxy hydroxyl compounds may be desirable and advantageous. During the final hardening operation and at higher temperatures the epoxy groups may react with hydroxyl groups to form more complex reaction products.

In the case of the polyepoxides produced by the reaction of a dihydric phenol and a diepoxide, the simplest or monomeric diepoxide product made from 2 mols of diepoxide and one of dihydric phenol may be considered to have the following general formula or structure:

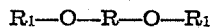

where R is the residue of the dihydric phenol and $R_1$ is an epoxy-hydroxy-containing residue of the diepoxide used. Thus in the case of the diepoxide from butylene dioxide and a dihydric phenol in the proportion of 2 mols of butylene diepoxide to 1 of dihydric phenol the resulting diepoxide may be considered to have the following formula or structure:

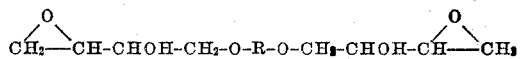

in which R is the residue of the dihydric phenol. It will be seen from the above formula that each terminal group or residue united to the dihydric phenol by an ether linkage contains both an epoxy group and a hydroxyl group.

In the case of more complex polymeric products, and assuming the formation of a straight chain polymer, the polymeric products may be considered to have the following formula or structure:

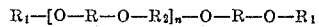

in which $R_1$ and R have the meaning above indicated and $R_2$ is a residue of the diepoxide containing e. g. 2 hydroxyl groups and $n$ indicates the degree of polymerization e. g., $n=1$ or more.

The above formula assumed a straight chain polymeric reaction in which the epoxide groups of the diepoxide react only with phenolic hydroxyls. The diepoxides may, however, react through one of their epoxide groups with an intermediate alcoholic hydroxyl to form branch chain polymers or polyepoxides.

In the case of a reaction of a dihydric phenol with more than equivalent amount of epichlorhydrin, the simplest diepoxide composition will be the diglycid ether of the dihydric phenol having the following formula or structure:

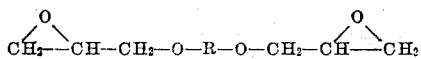

in which R is the residue of the dihydric phenol, while the more complex polymeric products will be diglycid ethers of polymeric products corresponding generally to the above formulae for polymeric products, except that the terminal group $R_1$ will in this case be the glycidyl group and the intermediate $R_2$ group will be the

group.

In general, the proportions of polyepoxide and complex polyhydric phenol polyether alcohol should be such that the polyepoxide used is in excess of that which is equivalent to the phenolic groups of the complex polyhydric phenol polyether alcohol, so that all of the phenolic hydroxyls will be reacted with the polyepoxide and so that the terminal groups will be epoxide-containing groups. Thus, in the case of complex dihydric phenol polyether alcohols and diepoxides, the proportion of diepoxide to dihydric phenol polyether alcohol should be more than 1 mol of diepoxide to 1 mol of dihydric phenol polyether alcohol and may be greater than 2 mols or more of diepoxide to one mol of dihydric phenol polyether alcohol, e. g., 3 mols of diepoxide to 2 mols of dihydric phenol polyether alcohol or 4 mols of diepoxide to 3 mols of dihydric phenol polyether alcohol or 5 mols of diepoxide to 4 mols of dihydric phenol polyether alcohol, etc.

Assuming complete reaction between all of the phenolic hydroxyl groups of the dihydric phenol polyether alcohols with epoxide groups of diepoxides, and assuming a straight chain reaction and polymerization, the number of intermediate diepoxide residues will be 1 less than the number of polyhydric phenol polyether alcohol residues, and there will be two terminal aliphatic residues containing epoxide groups. The intermediate alcoholic hydroxyls may under certain conditions, react with the diepoxide and, to the extent that the diepoxides react with such alcoholic hydroxyl groups, additional terminal epoxy-containing groups may also be present.

In general, however, the terminal phenolic hydroxyls of the complex polyhydric phenol polyether alcohols appear to be more reactive with the polyepoxides than the intermediate alcoholic hydroxyls. The presence of the alcoholic hydroxyl groups has the advantage that they can further react with epoxide groups particularly during the heating of the mixture to higher temperatures for converting the composition into a final insoluble infusible product.

The compositions containing the polyepoxides and the complex polyhydric phenol polyether alcohols can be used together in proportions such that they will react on heating, particularly in the presence of a small amount of an alkaline catalyst, to give a final infusible, insoluble film or molded article or other product. In the final reactions, any excess of epoxide which has not reacted with the phenolic hydroxyls of the complex polyhydric phenol polyether alcohol can react with alcoholic hydroxyl groups; and it is advantageous in many cases to have a substantial excess of the polyepoxide to enable such further reactions to take place.

Instead of making directly a final infusible insoluble product, the compositions containing the polyepoxide and the polyhydric phenol polyether alcohol, particularly where an excess of polyepoxide is used, can be reacted to form intermediate reaction products which are themselves more complex polyepoxides with terminal epoxide groups.

Where the diepoxide is a product such as the diglycid ether of a dihydric phenol or the diepoxide made from 1 mol of a dihydric phenol and 2 mols of an aliphatic diepoxide such as diglycid ether, or diepoxy butane, and where the polyhydric phenol polyether alcohol is also made e. g. from 2 mols of dihydric phenol and one of epichlorhydrin or 2 mols of dihydric phenol and 1 mol of an aliphatic diepoxide, this composition can be reacted, particularly where an excess of the diepoxide is used, to form an intermediate and more complex polyepoxide of resinous character which can itself be used and further heated and reacted to form an insoluble, infusible product.

Where the complex polyhydric phenol polyether alcohol is itself of high molecular weight and resinous in character, made by the reaction of several mols of dihydric phenol with a smaller number of mols of epichlorhydrin or of aliphatic diepoxide, the polyhydric phenol polyether alcohol will itself be of high molecular weight and only a small amount of a diepoxide is required for reacting with it, e. g., 2 mols of diepoxide to 1 mol of high molecular weight resinous polyhydric phenol polyether alcohol, although more than 2 mols of diepoxide may advantageously be used, particularly where reaction with alcoholic groups is also desired.

Where the polyepoxide is itself a complex product of resinous character, such as the high molecular weight epoxide resins made from dihydric phenol and an excess of epichlorhydrin and caustic alkali, or where the epoxide resin is made from several mols of aliphatic diepoxide and a smaller number of mols of dihydric phenol, the amount of polyhydric phenol polyether alcohol may be much smaller, depending upon the complexity and molecular weight of the polyhydric phenol polyether alcohol. In general, less than 1 phenolic hydroxyl of the polyhydric phenol polyether alcohol should be used for each epoxide group of the polyepoxide.

Where both the polyepoxide and the complex polyhydric phenol polyether alcohol are of high molecular weight and resinous in character, their reaction will take place through epoxide groups of the epoxide resin and phenolic, or both phenolic and alcoholic hydroxyl, groups of the polyhydric phenol polyether alcohol, and in this case an excess of the epoxide resin is advantageously used; or a small amount of a less complex polyepoxide is added to the mixture.

The reaction of the complex polyhydric phenol polyether alcohols and polyepoxy compounds can readily be accomplished by heating the reactants together for a short time. In general, reaction temperatures of around 50–250° C. can be used. The temperature and time for any given reaction depend on the proportions and reactivity of the reactants and whether the reaction is to be carried to completion or to an intermediate stage. In some cases it is advantageous to add traces of basic catalyst such as caustic alkali to the mixtures of polyepoxide and polyhydric phenol polyether alcohol, although in many if not most cases heat alone is sufficient to produce the required reaction and particularly in the case of intermediate reaction products of a resinous character.

The degree of polymerization can in part be regulated by regulating the proportions of excess polyepoxide used. Thus, when all of the phenolic hydroxyls have reacted with epoxide groups and the excess epoxide equivalent is present as terminal epoxide groups, the reaction is complete so far as terminal phenolic hydroxyls and polyepoxide is concerned. The tendency of the reaction appears to be one primarily between phenolic hydroxyls and epoxide groups, although reaction between epoxide groups and alcoholic hydroxyl groups may take place to some extent, particularly in the later stages of reaction. During the final reaction of converting the intermediate reaction product into a final infusible product the reaction appears to be one primarily between terminal epoxide groups and alcoholic hydroxyl groups, although, to the extent that phenolic hydroxyls may have remained unreacted in the intermediate product, further reaction between phenolic hydroxyls and epoxide groups can take place in the final hardening.

The present invention provides a wide range of compositions and reaction products including initial mixtures of polyhydric phenol polyether alcohols and polyepoxides, including monomeric and polymeric dihydric phenol polyether alcohols of varying degrees of complexity and polymerization, and also including polyepoxides which may be liquid aliphatic polyepoxides or aromatic polyepoxides such as diglycid ethers of dihydric phenols or which may be more complex resinous polyepoxides. Thus the polyepoxide may be of much lower molecular weight than the complex polyhydric phenol polyether alcohols; or the polyepoxide may itself be a complex resin and of much higher molecular weight than the polyhydric phenol polyether alcohol; or both may be of high molecular weight and resinous in character.

The new compositions can be prepared by admixing the complex polyhydric phenol polyether alcohol and the polyepoxide in the desired reacting proportions, and the mixture can be used as a coating or impregnating composition or in making molding compositions or in solution to make film-forming compositions, and the reaction which results in forming the final reaction product may be carried out after the initial composition has been so used.

Thus the complex polyhydric phenol polyether alcohol made from 2 mols of bis phenol and 1 mol of epichlorhydrin, or from 2 mols of bis phenol and 1 mol of diglycid ether, can be admixed with an aliphatic diepoxide such as diglycid ether, or an aromatic diepoxide such as the diglycid ether of bis phenol, or the diepoxide made from 2 mols of an aliphatic diepoxide such as diglycid ether and 1 mol of bis phenol, using proportions of e. g. 3 mols of the aliphatic or aromatic diepoxide to 2 mols of the complex dihydric phenol polyether alcohol.

On heating this mixture with the addition of a trace of a catalyst such as caustic soda or sodium phenolate or even without the addition of such a catalyst, reaction takes place between the epoxide groups of the polyepoxide and the phenolic hydroxyls of the dihydric phenol polyether alcohol. This reaction may be carried to completion to form a molded product or a hardened film by heating to higher temperatures, or the reaction mixture can be used in solution for impregnating porous or fibrous materials or it can be molded to form a molded article with final heating to convert the composition into the final reaction product. The use of such compositions has the advantage that the reaction takes place by direct addition between epoxide and hydroxyl groups and without the formation of byproducts which require removal.

The new compositions are advantageously made of intermediate reaction products of polyhydric phenols and aliphatic polyepoxides. Thus the initial reaction product can be made from a polyhydric phenol and a simple polyepoxide, using the polyhydric phenol in excess, to form an intermediate reaction product containing terminal phenolic hydroxyl groups, and which is itself a polyether derivative resulting from the reaction of polyhydric phenol and polyepoxide. Thus, for example, an intermediate reaction product can be made, e. g., from 2 mols of bis phenol and 1 mol of a diepoxide such as butylene diepoxide or bis-(2,3-epoxypropyl) ether, or from 3 mols of bis phenol and 2 of such diepoxides, or 4 mols of bis phenol and 3 mols of such diepoxides, etc. The resulting intermediate reaction products will be polyether derivatives of polyhydric phenols with terminal phenolic hydroxyl groups. Such intermediate reaction products can be admixed with further amounts of diepoxides sufficient to react with the free terminal phenolic hydroxyl groups and advantageously in excess of that amount to give a composition which on further heating will further react between epoxide groups and phenolic hydroxyl groups and also between epoxide groups and intermediate alcoholic hydroxyl groups to form final reaction products. Such compositions can similarly be used in forming molding mixtures or in solution to form coating compositions and the final hardening carried out in the mold or in the form of a film, etc.

The polyepoxides used with the polyhydric phenols may similarly be reaction products of polyhydric phenols with an excess of simple or aliphatic polyepoxide to form intermediate polyether derivatives of the polyhydric phenols having terminal epoxide groups. For example, 1 mol of bis phenol may be thus reacted with 2 mols of butylene diepoxide or of bis-(2,3-epoxypropyl) ether, or 2 mols of bis phenol can be reacted with 3 mols of such diepoxides, etc. to give intermediate reaction products which are polyether derivatives of bis phenol having terminal epoxide groups. And such intermediate reaction products can be admixed with intermediate reaction products having terminal phenolic hydroxyl groups, such as those above referred to, to form compositions capable of reaction on further heating to form the final reaction products. In such compositions the amount of terminal epoxide groups should in general be sufficient to react with the terminal phenolic hydroxyl groups and should advantageously be in excess of that amount so that reaction can also take place between epoxide groups and intermediate alcoholic hydroxyl groups.

In such intermediate reaction products it is not necessary that the reaction should be carried to completion in forming such intermediate reaction products since the further reaction in the final heating and hardening of the composition will take place through direct addition of epoxy and hydroxyl groups.

Intermediate compositions can also be prepared by using the polyhydric phenols and polyepoxides in proportions capable of reacting to form a final infusible product by carrying out the reaction to an intermediate stage such that it is still soluble or fusible and by then using the intermediate reaction product, e. g., in solution to form films or coating compositions or in making molding compositions, etc. and effecting the final reaction by further heating while the composition is in the form of a film or of a molding composition, etc.

In general the intermediate reaction products, unless too highly polymerized, are soluble in solvents such as acetone, methyl ethyl ketone, diacetone alcohol, cyclohexanone, etc. The resinous reaction products of lower melting point and lower degree of polymerization may be soluble in toluene but the higher melting resins of a higher degree of polymerization are insoluble in this solvent. Solutions of the intermediate resins or of reaction compositions, such as those above referred to, can be used in making clear and pigmented varnishes, in making transparent films and filaments, and in impregnating and laminating and coating wood, fabrics and other porous or fibrous materials, etc. When a small amount of a suitable catalyst is added to the solution, and in some cases even without the addition of such a catalyst, the resulting film or coating on heating is converted into an infusible product.

The intermediate reaction products, where the phenolic hydroxyls are completely or substantially completely reacted with the epoxides, will contain hydroxyl and epoxy groups as their reactive groups. These intermediate reaction products are useful for esterification with organic acids to form esters which are useful as plasticizers or as drying oil compositions, etc. depending upon the type of organic acid used. In general, the esters with low molecular weight acids such as acetic and benzoic acids give brittle resins which are soluble in typical varnish constituents including drying oils and are excellent resins for varnish manufacture. Esters of the new complex reaction products with unsaturated acids such as those derived from unsaturated oils form excellent drying compositions. The new reaction products can thus be used as polymeric polyhydric alcohols for producing drying oil compositions such as those described in my prior application Serial No. 502,317, filed September 14, 1943, now Patent No. 2,456,408. When the complex epoxides of the present invention are so used both the epoxide groups and the hydroxyl groups can be esterified, the epoxide group being for this purpose equivalent to two hydroxyl groups. Thus the new complex epoxide compositions, considered as polyhydric alcohols for esterification with fatty acids for making drying oil compositions, have terminal epoxy groups in the end components of the molecules as well as intermediate hydroxyl groups and both the epoxide and hydroxyl groups are reactive for esterification. Products of a complex polymeric nature may be made containing e. g., up to 15 or more hydroxyl groups, including each epoxy group as equivalent as two hydroxyl groups.

Esters made from the new complex epoxide reaction products with long chain saturated acids such as lauric, palmitic, and stearic acids give wax-like products useful as waxes and plasticizers. Many variations and types of useful products may be obtained by esterifying the new complex epoxy compositions with various combinations of saturated and unsaturated, monobasic and polybasic, and resin acids or the anhydrides of such acids.

While for purposes of esterification the epoxy groups of the new compositions are the equivalent of hydroxyl groups, for other purposes than esterification the epoxy groups are not the equivalent of hydroxyl groups, but are reactive groups capable of reacting with hydroxyl groups, and also capable of reaction with other reactants, particularly poly-functional and cross-linking reactants which enable insoluble, infusible products to be obtained. When an epoxide group reacts with an alcoholic hydroxyl group an ether linkage is formed and a hydroxyl group is also formed. The reaction products contain intermediate hydroxyl groups as well as terminal epoxide groups. Because of the property of epoxide groups of combining with hydroxyl groups the intermediate reaction products are capable of reacting under suitable conditions of temperature to form more complex reaction products or mixtures. Such compositions, particularly when a small amount of suitable catalyst is added such as an alkali phenoxide will further react by combining different molecules through ether linkages formed from epoxide and hydroxyl groups. Products of an intermediate degree of polymerization can thus be further reacted to form insoluble and infusible products in which most or all of the epoxide groups have been reacted with hydroxyl groups to form ether linkages.

The new products and compositions of the present invention are valuable products for making varnishes, protective coatings and films, as molding resins, or as molding compositions, as adhesives, as films or filaments, etc. Resinous products can readily be made of varying melting points, epoxide content and degree of polymerization from soft resins to harder resins of higher melting point. In general, these resins are soluble, unless too highly polymerized, in solvents such as acetone, methyl ethyl ketone, diacetone alcohol, cyclohexanone, etc. And solutions of the resins can be used in making clear or pigmented varnishes, in making transparent films, and in impregnating wood, fabrics and other fibrous materials, for bonding wood in making laminated structures or plywood, for surface coating of wood, fabric, etc., and for making pigmented as well as clear films or coatings on glass, wood and metal, etc. When a small amount of a catalyst is added the resulting film or coating, etc. on heating, e. g. to 150° C. or 200° C. for a short time, is converted into an insoluble, infusible product. The new compositions make excellent bonding materials for glass when polymerized in layers between glass plates.

Similarly, the new products and compositions can be used in making molding compositions and articles by admixing a small amount of catalyst and heating to effect final hardening or polymerization. The products are characterized by remarkable chemical resistance.

It is one of the characteristics of the new products that on final polymerization, or reaction between epoxide and hydroxyl groups, the products tend to expand on hardening, as distinguished from resins that shrink on heat hardening.

This lack of contraction or slight expansion in the mold on hardening is highly valuable for many applications, enabling tight fitting molded articles to be obtained. For example, brushes of many types are made by using a heat converting resin to cement the bristles into the brush ferrule. If the resin contracts during heat conversion, the molded article tends to become loose fitting in the ferrule. The new complex epoxide resins and compositions of the present invention give a tight fitting mold within the brush ferrule. Similarly molded insets can be made which are tight fitting when the composition has been molded in place.

Molding mixtures and reaction mixtures can be made from products of an intermediate degree of polymerization, and in some cases without completion of the reaction between phenolic hydroxyls and the epoxide groups in the intermediate product. Such a partially reacted product, on further heating and conversion, e. g. in molding compositions or film layers, can further react between phenolic and alcoholic hydroxyls and epoxy groups in making the final molded or hardened product or composition. The remarkable chemical inertness of the final products appears to be due to the fact that they are free or substantially free from reactive groups other than hydroxyl groups.

Similarly reaction mixtures may be prepared with an excess of polyhydric phenol and with some free terminal phenolic hydroxyl groups, and a solid resinous product so prepared can be mixed with sufficient polyepoxide to react with the phenolic hydroxyls, or excess of such amount and the resulting mixture used as a molding mixture, or it may be formed into a varnish solution and the reaction between the phenolic hydroxyls and diepoxides carried out during the final hardening operation. Similarly, intermediate reaction products of polyhydric phenols and diepoxide can be prepared, e. g., one containing an excess of dihydric phenol and the other an excess of diepoxide, and these two products mixed in proportion such that there is sufficient epoxide content to react with all of the phenolic groups when the mixture is used as a molding composition or in forming a varnish and the composition is heated to effect the final hardening operation, particularly when a small amount of catalyst is present in the composition.

The invention will be further illustrated by the following specific examples, but it will be understood that the invention is not limited thereto.

The first two examples illustrate the preparation of special polyepoxides from epichlorhydrin and trihydric alcohols.

*Example I.*—In a reaction vessel provided with mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium aluminate. With continuous agitation this reaction mixture was gradually heated to 93° C. over a period of 1 hour and 51 minutes and held at this temperature for 8 hours and 49 minutes. After cooling to room temperature the inorganic material was removed by filtration. The dioxane and low boiling products were removed by heating the filtrate to 205° C. at 20 mm. pressure to give 261 parts of a pale yellow product.

This product can be distilled at temperatures above 200° C. at 2 mm. pressure provided it is sufficiently freed from impurities but unless care is taken it is liable to undergo a violent exothermic reaction. It is not, however, necessary to purify this product by distillation since such by-products as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering 1 HCl is equivalent to one epoxide group.

The epoxide equivalent represents the equivalent weight of the product per epoxide group. The epoxide equivalent so determined was 149. The molecular weight as determined by a standard boiling point elevation method was 324. This represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

*Example II.*—By a procedure similar to that described in Example I, 1 mol of trimethylol propane and 3 mols of epichlorhydrin were condensed with boron trifluoride and finally treated with sodium aluminate to give 299 parts of a pale yellow liquid. The product had an equivalent weight to epoxide of 151 and an average molecular weight of 292.2.

This corresponds to approximately 1.94 epoxide groups per molecule, assuming an average molecular weight.

The product of this example can also be distilled at high temperatures and low pressures to give a water white liquid, but such further purification is not necessary and the product obtained can be directly used in making the new compositions. Or the purified product can be produced and similarly used.

The procedure of Examples I and II can be used in preparing complex polyepoxy products from other polyhydric alcohols containing 3 or more hydroxyl groups, for example, from higher molecular weight alcohols containing 3 hydroxyl groups or from higher polyhydric alcohols such as mannitol, sorbitol, erythritol or polyallyl alcohol. For example, a polyepoxide has been obtained from polyallyl alcohol and epichlorhydrin which contained 2.45 epoxide groups per average molecular weight. In general, with polyepoxides made by the reaction of epichlorhydrin on polyhydric alcohols containing 3 or more hydroxyl groups, the number of epoxide groups per molecule (based on average molecular weight) has been found to be materially less than that corresponding to 1 epoxide group per molecule of epichlorhydrin used; but in general polyepoxides can be so produced containing an equivalent of around 2 or more epoxide groups per molecule which are valuable polyepoxides for use in making the new compositions and reaction products of the present invention.

The following examples, III, IV, V and VI, illustrate the preparation of some of the more complex polyhydric phenols for use in making the new compositions.

*Example III.*—In a reaction vessel provided with a reflux condenser and a mechanical stirrer was placed 101.5 parts (0.445 mols) of bis phenol and 68 parts (0.666 mols) of acetic anhydride. This reaction mixture was refluxed for 1 hour with continuous agitation. To this partially acetylated bis phenol was added 187 parts (0.333 mols considered as dimeric acids) of polymerized soy bean oil acids. These polymerized acids were prepared by heating the methyl esters of soy bean acids at 325° C. in the presence of anthraquinone followed by removal of unpolymerized methyl esters by vacuum distillation and liberation of the polymerized acids from the residual polymerized methyl esters by saponification. With continued agitation this reaction mixture was heated at 250 to 260° C. until the theoretical amount of acetic acid displaced was removed by distillation and the acid value of the resulting product had reached 3.4. The product was a viscous sticky product.

The product of this example may be considered a polyhydric phenol in which the bis phenol residues are united through the residues from the dibasic acid and illustrates the preparation of special polyhydric phenols from simpler polyhydric phenols.

*Example IV.*—In a reaction vessel provided with a reflux condenser and a mechanical stirrer was placed 107 parts (0.5 mol) of 1,4-dibromobutene, 171 parts (0.75 mol) of bis phenol, 40 parts (1 mol) of sodium hydroxide and 200 parts of water. This reaction mixture was refluxed for 6 hours with continuous agitation. The upper water layer was removed by decantation and the product was washed three times by stirring with boiling water. The theoretical yield of a product softening (Durrans mercury method) at 70° C. was obtained.

*Example V.*—A polyhydric phenol was prepared by the reaction of 3 mols of bis phenol and 2 mols of $\beta,\beta'$-dichlorodiethyl ether with 8 mols of potassium hydroxide and 1 liter of water. The procedure was the same as that in Example IV except the reaction time was refluxing for 48 hours. The product softened at 61° C.

Examples IV and V illustrate the production of complex polyhydric phenols by the reaction of simpler polyhydric phenols (e. g., bis phenol) with dichlorides.

*Example VI.*—In a reaction vessel provided with a reflux condenser and a mechanical stirrer was placed 184 parts (0.805 mol) of bis phenol, 88 parts (0.602 mol) of adipic acid and 121 parts (1.28 mol) of acetic anhydride. This reaction mixture was heated at 240–255° C. with continuous agitation, until the acetic acid was removed and the product had an acid value below 5. This product had a softening point of 82° C.

This example, like Example III, illustrates the production of special, complex polyhydric phenols in which the residues of the simpler polyhydric phenols are united through dibasic acid residues.

The following Examples VII to XIII illustrate the production of polyhydric phenol polyether alcohols.

*Example VII.*—This example illustrates the production of a dihydric phenol polyether alcohol from 2 mols of bis phenol and 1 mol of epichlorhydrin. In a closed kettle equipped with an agitator and a thermometer, was placed 2500 parts of water, 117 parts of commercial caustic soda (2.8 mols of NaOH) and 912 parts of bis phenol (4 mols). This mixture was heated with stirring to 60° C. and 188 parts (2.04 mols) of epichlorhydrin was added. Heating was continued until the reaction mixture reached 98° C. and the temperature was held at 98–100° C. for 1 hour. The excess alkali was neutralized with about 54 parts of concentrated hydrochloric acid and the water insoluble resinous product was washed six times with hot water to remove the by-product salt. As much water as possible was removed by decantation and the residual water was removed by heating the resin with efficient agitation to 150° C. The product was poured into a metal pan to cool. When cold the product was a hard resinous solid having a Durran's melting point of 81° C.

*Example VIII.*—This example illustrates the production of a dihydric phenol polyether alcohol by the reaction of 1 mol of the diglycid ether of bis phenol with 2 mols of bis phenol. In a vessel equipped with stirrer and thermometer was weighed 400 parts of practical grade diglycid ether of bis phenol (epoxide equivalent 200) and 456 parts of bis phenol (2 mols). The mixture was heated with stirring for 1½ hours at 200° C. When cold, the product was a hard resinous solid having a Durran's melting point of 94° C.

*Example IX.*—This example illustrates the production of a dihydric phenol polyether alcohol by the reaction of 1 mol of diglycid ether with 2 mols of bis phenol. In a vessel equipped with stirrer and thermometer was weighed 130 parts (1 mol) of diglycid ether and 456 parts (2 mols) of bis phenol. The mixture was heated with stirring for 1½ hours at 160° C. When cold, the product was a resinous solid having a Durran's melting point of 83° C.

*Example X.*—This example illustrates the production of a polyhydric phenol polyether alcohol by the reaction of 1 mol of the aliphatic polyepoxide of Example I with 2 mols of bis phenol. A mixture of 290 parts of the product of Example I (having an epoxide equivalent of 145) and 456 parts (2 mols) of bis phenol was heated with stirring at 160° C. for 2 hours. The product when cold was a resinous solid melting at 71° C. (Durran's method).

*Example XI.*—This example illustrates the production of a polyhydric phenol polyether alcohol by the reaction of 1 mol of a polyepoxide resin, which is itself produced by the reaction of diglycid ether and bis phenol, with 2 mols of bis phenol. A mixture of 39 parts (0.3 mol) of diglycid ether and 34 parts (0.15 mol) of bis phenol was heated to 160° C. for 1½ hours to give a product having a Durran's melting point of 20° C. and an epoxide equivalent of 279. To 14 parts (0.025 mol) of this product was added 11.2 parts (0.05 mol) of bis phenol and this mixture was heated to 160° C. for 1½ hours. After cooling, the product was a hard resinous solid with a Durran's melting point of 90° C.

*Example XII.*—This example illustrates the production of a polyhydric phenol polyether alcohol by the reaction of an epoxide resin, produced from 2 mols of epichlorhydrin and 1 mol of bis phenol, with 2 mols of bis phenol.

The polyepoxide used was an epoxide resin resulting from the reaction of 2 mols of epichlorhydrin and 1 of bis phenol in the presence of caustic alkali and had a melting point of 40° C. and an epoxide equivalent of 318. To 636 parts of this epoxide resin was added 456 parts of bis phenol. This mixture was heated with agitation for 1½ hours at 200° C. When cold, the product was a hard, brittle solid having a melting point (Durran's method) of 104° C.

*Example XIII.*—This example illustrates the production of a higher melting point polyhydric phenol polyether alcohol.

The epoxide resin used in this example was produced by the reaction of 5 mols of bis phenol and 7 mols of epichlorhydrin with 9.05 mols of caustic soda and had a softening point of 81° C. and an epoxide equivalent of 601. To 601 parts of this resin was added 228 parts of bis phenol. This mixture was heated with agitation for 1½ hours at 200° C. and then poured into a metal pan to cool. The product was a hard, brittle resin with a melting point of 125° C. (Durran's method).

The following Examples XIV to XVIII illustrate the preparation of intermediate or complex polyepoxides for use in making the new compositions. Examples XIV and XV illustrate the production of monomeric polyepoxides by the reaction of 1 mol of a dihydric phenol with 2 mols of an aliphatic diepoxide, while Examples XVI, XVII and XVIII illustrate the production of polymeric polyepoxides.

*Example XIV.*—A mixture of 596 parts of the polyepoxide of Example I and 228 parts of bis phenol was heated with stirring at 158–160° C. for 1½ hours to give a product having a Durran's melting point of 32° C. and an epoxide equivalent of 452.

*Example XV.*—A mixture of 39 parts of diglycid ether and 34 parts of bis phenol was heated to 160° C. for 1½ hours. When cold, the product was a soft sticky resin with a melting point of 20° C. (Durran's method) and an epoxide equivalent of 279.

*Example XVI.*—This example illustrates the production of a polyepoxide by the reaction of 2 mols of the diglycid ether of bis phenol with 1 mol of bis phenol. To 400 parts of practical grade diglycid ether of bis phenol (with an epoxide equivalent of 200) was added 114 parts of bis phenol. This mixture was heated with stirring to 200° C. for 1½ hours. When cold, the product was a hard brittle resinous solid having a Durran's melting point of 82° C. and an epoxide equivalent of 561.4.

*Example XVII.*—This example illustrates the production of a higher melting point epoxide resin from a lower melting point epoxide resin. To 636 parts of a low melting point epoxide resin, produced by the reaction of 2 mols of epichlorhydrin and 1 of bis phenol, with caustic soda and having a melting point of 40° C. and an epoxide equivalent of 318 was added 114 parts of bis phenol. This mixture was heated at 200° C. for 1½ hours and then poured into a metal pan to cool. The cold product was a hard, brittle resin melting at 95° C. (Durran's method) and having an epoxide equivalent of 809.

*Example XVIII.*—This example also illustrates the production of a higher melting epoxide resin from a lower melting epoxide resin. To 601 parts of an epoxide resin prepared from 5 mols of bis phenol and 7 mols of epichlorhydrin with 9.05 mols of caustic soda and having a melting point of 81° C. and an epoxide equivalent of 601, was added 57 parts of bis phenol. This mixture was heated with agitation at 200° C. for 1½ hours. When cold the product was a hard, brittle resin with a Durran's melting point of 142° C. and an epoxide equivalent of 2682.

The following Examples XIX to XXXVII illustrate the new compositions made with polyhydric phenol polyether alcohols and polyepoxides, in the production of higher melting point epoxide resins and final infusible insoluble products therefrom.

*Example XIX.*—This example illustrates the reaction of 1 mol of a dihydric phenol produced from bis phenol and epichlorhydrin (Example VII) with 2 mols of diglycid ether. A mixture of 51.2 parts of the product of Example VII and 26 parts of diglycid ether was heated to 160° C. and held at this temperature for 1 hour. When cold, the product was a hard resinous product having a melting point of 74° C. (Durran's method) and an epoxide equivalent of 500.

*Example XX.*—This example illustrates the reaction of 1 mol of a dihydric phenol, produced from bis phenol and epichlorhydrin, with 2 mols of the diglycid ether of bis phenol. A mixture of 51.2 parts (0.1 mol) of the product of Example VII and 80 parts of practical grade diglycid ether of bis phenol (epoxide equivalent 200) was heated to 200° C. for 1½ hours. The product, when cold, was a hard brittle resin having a melting point of 83° C. (Durran's method) and an epoxide equivalent of 578.

*Example XXI.*—This example illustrates the reaction of a dihydric phenol polyether alcohol, produced from 1 mol of diglycid ether and 2 mols of bis phenol (Example IX), with 2 mols of diglycid ether. A mixture of 5.9 parts of the product of Example IX and 2.6 parts of diglycid ether was heated to 160° C. for 1½ hours. The product, when cold, was a hard brittle resin melting at 87° C. (Durran's method). It had an epoxide equivalent of 615.

*Example XXII.*—This example illustrates the reaction of 1 mol of the dihydric phenol polyether alcohol of Example XII with 2 mols of diglycid ether. A mixture of 10.9 parts of the product of Example XII and 2.6 parts of diglycid ether was heated at 160° C. for 1½ hours. After the product had cooled, it was a hard brittle resin having a Durran's melting point of 113° C. and an epoxide equivalent of 835.

*Example XXIII.*—This example illustrates the reaction of 1 mol of the dihydric phenol polyether alcohol of Example IX with 2 mols of the diglycid ether of bis phenol. A mixture of 5.9 parts of the product of Example IX and 8.0 parts of a practical grade of diglycid ether of bis phenol (epoxide equivalent 200) was heated to 160° C. for 1½ hours. After cooling, the product was a hard brittle solid having a melting point (Durran's method) of 83° C. and an epoxide equivalent of 636.

*Example XXIV.*—This example illustrates the reaction of 1 mol of the polyhydric phenol polyether alcohol of Example XI with 2 mols of diglycid ether of bis phenol. A mixture of 10.2 parts of the product of Example XI and 8.0 parts of a practical grade of diglycid ether of bis phenol (epoxide equivalent 200) was heated for 1½ hours at 160° C. After cooling the product was a resinous solid having a Durran's melting point of 85° C. and an epoxide equivalent of 818.

*Example XXV.*—This example illustrates the reaction of 2 mols of the polyhydric phenol polyether alcohol of Example VIII with 3 mols of diglycid ether. A mixture of 17.2 parts of the product of Example VIII and 3.9 parts of diglycid ether was heated at 160° C. for 1½ hours. After cooling, the product was a hard brittle resin having a Durran's melting point of 93° C. and an epoxide equivalent of 567.

*Example XXVI.*—This example illustrates the reaction of 2 mols of the polyhydric phenol polyether alcohol of Example IX with 3 mols of diglycid ether. A mixture of 11.8 parts of the product of Example IX and 3.9 parts of diglycid ether was heated for 1½ hours at 160° C. After cooling, the product was a hard brittle resin having a Durran's melting point of 103° C. and an epoxide equivalent of 1077.

*Example XXVII.*—This example illustrates the reaction of 1 mol of the polyhydric phenol polyether alcohol of Example VIII with 2 mols of the polyepoxide of Example I. A mixture of 8.6 parts (0.01 mol) of the product of Example VIII and 5.0 parts of the product of Example I was heated for 1½ hours at 160° C. After cooling, the product was a semi-solid resin with a Durran's melting point of 64° C. and an epoxide equivalent of 623.

*Example XXVIII.*—This example illustrates the reaction of 2 mols of the polyhydric phenol polyether alcohol of Example IX with 3 mols of the diglycid ether of bis phenol. A mixture of 11.8 parts of the product of Example IX and 12.0 parts of a practical grade of diglycid ether of bis phenol (epoxide equivalent 200) was heated for 1½ hours at 160° C. After cooling, the product was a hard resinous solid having a melting point of 36° C. (Durran's method) and an epoxide equivalent of 848.

*Example XXIX.*—This example illustrates the reaction of 2 mols of the polyhydric phenol polyether alcohol of Example XII with 3 mols of the diglycid ether of bis phenol. A mixture of 21.8 parts of the product of Example XII and 12 parts of a practical grade of diglycid ether of bis phenol (epoxide equivalent 200) was heated for 1½ hours at 200° C. After cooling, the product was a hard brittle resin with a melting point of 109° C. (Durran's method) and an epoxide equivalent of 1300.

*Example XXX.*—This example illustrates the reaction of 1 mol of the polyhydric phenol polyether alcohol of Example VII with 2 mols of an epoxide resin resulting from the reaction of bis phenol and diglycid ether (Example XV). A mixture of 5.1 parts of the product of Example VII and 11.2 parts of the product of Example XV was heated for 1½ hours at 160° C. After cooling, the product was a hard brittle resin with a Durran's melting point of 106° C. and an epoxide equivalent of 1092.

*Example XXXI.*—This example illustrates the reaction of 1 mol of the polyhydric phenol polyether alcohol of Example VII with 2 mols of the epoxide resin of Example XIV. A mixture of 51.2 parts of the product of Example VII and 180.8 parts of the product of Example XIV was heated to 160° C. After 35 minutes at this temperature the mixture became an insoluble gel.

*Example XXXII.*—This example illustrates the reaction of 1 mol of the polyhydric phenol polyether alcohol of Example VIII with 2 mols of the epoxide resin of Example XV. A mixture of 8.6 parts of the product of Example VIII and 11.2 parts of the product of Example XV was heated for 1½ hours at 160° C. After cooling, the product was a hard brittle resin having a melting point of 92° C. (Durran's method) and an epoxide equivalent of 1016.

*Example XXXIII.*—This example illustrates the reaction of 1 mol of polyhydric phenol polyether alcohol of Example IX with 2 mols of the epoxide resin of Example XV. A mixture of 5.9 parts of the product of Example IX and 11.2 parts of the product of Example XV was heated for 1½ hours at 160° C. After cooling, the product was a hard brittle resin with a Durran's melting point of 104° C. and an epoxide equivalent of 1667.

*Example XXXIV.*—This example illustrates the reaction of 1 mol of the polyhydric phenol polyether alcohol of Example XI with 2 mols of the epoxide resin of Example XVI. A mixture of 10.2 parts of the product of Example XI and 22.5 parts of the product of Example XVI was heated for 1½ hours at 160° C. After cooling, the product was a hard brittle resin with a Durran's melting point of 100° C. and an epoxide equivalent of 1128.

*Example XXXV.*—This example illustrates the reaction of 1 mol of the polyhydric phenol polyether alcohol of Example VIII with 2 mols of an epoxide resin having a softening point of 81° C. and an epoxide equivalent of 601 resulting from the reaction of 5 mols of bis phenol and 7 mols of epichlorhydrin with 9.05 mols of caustic soda. A mixture of 8.6 parts of the product of Example VIII and 24 parts of the product of the epoxide resin was heated for 1½ hours at 200° C. After cooling, the product was a hard brittle solid with a Durran's melting point of 124° C. and epoxide equivalent of 1648.

*Example XXXVI.*—This example illustrates the reaction of 2 mols of the polyhydric phenol polyether alcohol of Example VIII with 3 mols of an epoxide resin resulting from the reaction of 2 mols of epichlorhydrin and 1 of bis phenol and having a melting point of about 40° C. and an epoxide equivalent of 318. A mixture of 19.2 parts of the product of Example VIII and 19.1 parts of the epoxide resin was heated for 1½ hours at 200° C. When cold, the product was a hard brittle solid with a Durran's melting point of 110° C. and an epoxide equivalent of 1951.

*Example XXXVII.*—This example illustrates the reaction of 1 mol of the polyhydric phenol polyether alcohol of Example XIII with 2 mols of the same epoxide resin referred to in the preceding example. A mixture of 16.6 parts of the product of Example XIII and 12.7 parts of the epoxide resin was heated for 1½ hours at 200° C. When cold, the product was a hard, brittle resin with a Durran's melting point of 122° C. and an epoxide equivalent of 1558.

The reaction products of the above examples can be dissolved in solvents, particularly ketonic solvents, to form solutions for use as varnishes or as coating or impregnating solutions, and these compositions, particularly when a small amount of an alkali catalyst is added, can be converted by heating into an insoluble, infusible film. Similarly, the initial compositions, before reaction, can be dissolved in solvents and used as impregnating solutions or as varnish solutions and on heating, together with a small amount of an alkali catalyst, can be converted into insoluble, infusible films. When a small amount of an alkali catalyst is added to the initial compositions, they can be used as molding mixtures to form insoluble, infusible products.

For example, 10 parts of the polyhydric phenol polyether alcohol of Example XIII and 10 parts of an epoxide resin produced from bis phenol and an excess of epichlorhydrin and having a softening point of 98° C. and an epoxide equivalent of 962 can be dissolved in 25 parts of Cellosolve acetate with the addition of 0.4 part of diethylene triamine and used as a varnish or film-forming solution. A 3-mil film of this solution, when baked at 200° C. for 10 minutes, gave a hard, tough, solvent-resistant film.

In a similar manner, when 10 parts of the polyhydric phenol polyether alcohol of Example XII and 20 parts of the epoxide resin of softening point 98° C. were dissolved in 30 parts of Cellosolve acetate and 0.8 parts of diethylene triamine was added, a 3-mil film of this solution, when baked at 200° for 10 minutes, gave a hard, tough, solvent-resistant film.

In a similar manner, a solution of 10 parts of the polyhydric phenol polyether alcohol of Example XIII and 20 parts of a high melting point epoxide resin having a softening point of 130° C. and an epoxide equivalent of 1833 was dissolved in 45 parts of Cellosolve acetate and 0.4 part of diethylene triamine added; and a 3-mil film of this solution, when baked at 200° C. for 10 minutes, gave a hard, tough, solvent-resistant film.

A similar film was obtained when 10 parts of the product of Example XIII and 40 parts of the high melting point epoxide resin were dissolved in 115 parts of Cellosolve acetate with the addition of 0.8 part of diethylene triamine.

Solutions were made of the products of Examples XXIV, XXVIII, XXX and XXXIV, and films formed therefrom as follows: To a 50% solution of these respective resins in Cellosolve acetate was added 4%, based on the weight of the resin, of diethylene triamine. 3-mil films of these solutions on glass were baked at 150° C. for 30 minutes. In each case, the film was a hard, tough and flexible film.

Solutions were made in Cellosolve acetate containing 84% of the resinous product of the examples indicated below and also containing 15% of butylated urea formaldehyde resin (Beetle 216-8) and 1% morpholine p-toluene sulfonate, the solutions containing 50% of solvent. 3 mil films of these solutions on glass were baked at 150° C. for 30 minutes to give films having the following properties. The resinous products of Examples XXIV, XXV and XXVIII gave very hard films. The resinous products of Examples XXVI, XXXII, XXXIV and XXXV gave hard, tough films. The resinous product of Example XXX gave a hard and tough and somewhat more flexible film.

The following examples further illustrate the use of the polyhydric phenol polyether alcohols with intermediate diepoxide resins and the use of sodium phenoxide as a catalyst.

*Example XXXVIII.*—To a solution of 10.9 parts (0.01 mol) of the product of Example XII and 9.0 parts (0.01 mol) of the product of Example XIV in 20 parts of Cellosolve acetate was added 0.5 part of a 15% solution of sodium phenoxide in ethylene glycol. A 3 mil film of this solution drawn on glass was baked at 150° C. for 30 min. to give a hard, tough, flexible film.

*Example XXXIX.*—To a solution of 16.6 parts (0.01 mol) of the product of Example XIII and 9.0 parts (0.01 mol) of the product of Example XIV in 25.6 parts of Cellosolve acetate was added 0.7 parts of a 15% solution of sodium phenoxide in ethylene glycol. A 3 mil film of this solution drawn on glass was baked at 150° C. for 30 min. to give a hard, tough flexible film.

*Example XL.*—To a solution of 7.5 parts (0.01 mol) of the product of Example X and 16.2 parts (0.01 mol) of the product of Example XVII in 23.7 parts of Cellosolve acetate was added 0.6 parts of a 15% solution of sodium phenoxide in ethylene glycol. A 3 mil film of this solution drawn on glass was baked at 150° C. for 30 min. to give a hard, tough film.

*Example XLI.*—To a solution of 5.1 parts (0.01 mol) of the product of Example VII and 18.1 parts (0.02 mol) of the product of Example XIV in 23.2 parts of Cellosolve acetate was added 0.3 parts of a 15% solution of sodium phenoxide in ethylene glycol. A 3 mil film of this solution drawn on glass was baked at 150° C. for 30 min. to give a hard, tough adherent film.

*Example XLII.*—To a solution of 5.1 parts (0.01 mol) of the product of Example VII and 9.0 parts (0.01 mol) of the product of Example XIV in 14.1 parts of Cellosolve acetate was added 0.2 parts of a 15% solution of sodium phenoxide in ethylene glycol. A 3 mil film of this solution drawn on glass was baked at 150° C. for 30 min. to give a hard, tough, flexible film.

*Example XLIII.*—To a solution of 7.5 parts (0.01 mol) of the product of Example X and 32.4 parts (0.02 mol) of the product of Example XVII in 40 parts of Cellosolve acetate was added 1 part of a 15% solution of sodium phenoxide in ethylene glycol. A 3 mil film of this solution drawn on glass was baked at 150° C. for 30 min. to give a hard, tough film.

The new compositions of polyhydric phenol polyether alcohols and polyepoxides are valuable compositions for use in the manufacture of varnishes, molding compositions, adhesives, etc., being capable of reaction to give reaction products varying from hard, brittle, fusible solids to hard, non-brittle, infusible solids. Similarly, the reaction products, where an excess of polyepoxide is used, and a high melting point epoxide resin product is formed, are also valuable products for use in the manufacture of varnishes, molding compositions, adhesives, etc., being capable of polymerization or further reaction, particularly in the presence of a small amount of an alkaline catalyst to give hard, infusible compositions and films.

It is a characteristic of the compositions of the present invention that they react through epoxide and hydroxyl groups to form addition-reaction products, and without the evolution of byproducts. Accordingly, the reaction can be carried out by using the initial ingredients in solution in organic solvents or in molding compositions and reaction products can be obtained which are either higher melting point epoxide resins or final infusible products.

The new reaction products, when they contain epoxide groups, can be further reacted with compounds containing active hydrogen, such as amines, and particularly polyamines, amides, mercaptans, polyhydric alcohols, polyimines, etc. to give a wide variety of valuable reaction products. Thus, difunctional reactants or polyfunctional reactants may serve to cross-link different molecules through reaction with terminal epoxide groups, and in some cases through intermediate hydroxyl groups. By using a difunctional reactant or polyfunctional reactant that reacts with epoxide groups but not with hydroxyl groups, in proportions equivalent to the epoxide groups, different molecules may be joined together by cross-linking in this way. Where cross-linking reagents are used that react with hydroxyl, or with both hydroxyl and epoxy groups, a different and more complex structure may be obtained. The use of less than the equivalent amount of cross-linking reagents enables modified products to be obtained, and in some cases infusible products.

The new complex reaction products of the polyhydric phenol polyether alcohols and polyepoxides, when the reaction is not carried to completion, can advantageously be further reacted with amines and particularly polyfunctional amines such as polyethylene polyamines, with resulting cross-linking through the amines, or with the amines acting as catalysts.

Other polyfunctional cross-linking reactants which react with epoxide groups or with hydroxyl groups or with both epoxide and hydroxyl groups can similarly be used for bringing about cross-linking which may be accompanied by further reaction of epoxide and hydroxyl groups to form high molecular weight products or infusible products including diisocyanates, e. g. methylene bis (4-phenyl) isocyanate, dialdehydes, e. g., glyoxal, dimercaptans, amides, polyamides, etc.

The final infusible reaction and polymerization products made with the new compositions and the new reaction products have a remarkable combination of desirable properties including resistance to water, solvents, alkalies, and acids, toughness combined with hardness, flexibility at low temperatures, ability to withstand high temperatures with little or no discoloration, resistance to chemicals, wettability to most pigments, low viscosity at high solids content of solutions, and hardening of thick films through chemical reactions within the film itself when a suitable catalyst or cross-linking reactant is used so that paint and varnish coatings far beyond the usual thickness can be applied.

This application is in part a continuation of my prior application Ser. No. 626,449, filed November 2, 1945.

I claim:

1. Polyhydric phenol - epoxide compositions consisting essentially of polyepoxides free from reactive groups other than epoxide and alcoholic hydroxyl groups and polyhydric phenol polyether alcohols having terminal phenolic and intermediate alcoholic hydroxyl groups and being free from reactive groups other than hydroxyl groups.

2. Compositions as defined in claim 1 in which the epoxide groups of the polyepoxide are in excess of the phenolic hydroxyls of the polyhydric phenol polyether alcohol.

3. Compositions as defined in claim 1 in which the polyhydric phenol polyether alcohols have the following formula

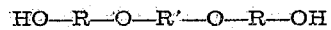

HO—R—O—R'—O—R—OH in which R is the hydroxyl-free nucleus of the dihydric phenol and R' is an aliphatic alcoholic hydroxyl-containing nucleus.

4. Compositions as defined in claim 1 in which the polyhydric phenol polyether alcohol has the following formula

HO—R—[O—R'—O—R]$_x$—O—R'—O—R—OH in which R is the hydroxyl-free nucleus of a dihydric phenol, R' is an aliphatic alcoholic hydroxyl-containing nucleus, and $x$ indicates the degree of polymerization.

5. Compositions as defined in claim 1 in which the polyepoxide is an aliphatic polyepoxide.

6. Compositions as defined in claim 1 in which the polyepoxide is a polyepoxide ether of a polyhydric phenol having terminal epoxide-containing aliphatic groups.

7. Compositions as defined in claim 1 in which the polyepoxide is an epoxide resin having terminal epoxide groups.

8. The method of making higher melting point epoxide resins and insoluble infusible products which comprises reacting polyhydric phenol polyether alcohols having terminal phenolic and intermediate alcoholic hydroxyl groups and free from reactive groups other than hydroxyl groups with polyepoxides free from reactive groups other than epoxide and alcoholic hydroxyl groups in proportions such that the epoxide groups of the polyepoxide are at least equivalent to the phenolic groups of the polyhydric phenol polyether alcohol.

9. Compositions as defined in claim 1, in which the polyhydric phenol polyether alcohol is a polyether alcohol of p,p'-dihydroxydiphenyldimethyl methane.

10. Compositions as defined in claim 1, in which the polyepoxide is a monomeric polyepoxide ether of p,p'-dihydroxydiphenyldimethyl methane having terminal epoxide-containing aliphatic groups.

11. Compositions as defined in claim 1, in which the polyepoxide is a polymeric polyepoxide ether of p,p'-dihydroxydiphenyldimethyl methane having terminal epoxide-containing aliphatic groups.

12. Compositions as defined in claim 1 in which the polyhydric phenol polyether alcohol is a polyether alcohol of p,p'-dihydroxydiphenyldimethyl methane and in which the polyepoxide is a polyepoxide ether of p,p'-dihydroxydiphenyldimethyl methane having terminal epoxide-containing aliphatic groups.

13. Compositions as defined in claim 1, in which the polyepoxide is an epoxide resin having terminal epoxide groups, which epoxide resin is a polyepoxide ether of p,p'-dihydroxydiphenyldimethyl methane having terminal epoxide-containing aliphatic groups.

14. The method of making higher melting point epoxide resins and insoluble infusible products which comprises reacting polyhydric phenol polyether alcohols having terminal phenolic and intermediate alcoholic hydroxyl groups and free from reactive groups other than hydroxyl groups with polyepoxides, which are polyepoxide ethers of p,p'-dihydroxydiphenyldimethyl methane having terminal epoxide-containing aliphatic groups and which are free from reactive groups other than epoxide and alcoholic hydroxyl groups, in proportions such that the epoxide groups of the polyepoxide are at least equivalent to the phenolic groups of the polyhydric phenol polyether alcohol.

SYLVAN OWEN GREENLEE.

References Cited in the file of this patent

UNITED STATES PATENTS

| Number | Name | Date |
|---|---|---|
| 2,558,949 | Greenlee | July 3, 1951 |